United States Patent
Chatterjea

(12) 
(10) Patent No.: US 6,634,653 B2
(45) Date of Patent: Oct. 21, 2003

(54) RIDE CONTROL SYSTEM FOR CONSTRUCTION EQUIPMENT

(75) Inventor: Probir Chatterjea, Sleepy Hollow, IL (US)

(73) Assignee: Probir Chatterjea & Associates, Inc., Sleepy Hollow, IL (US)

( * ) Notice: Subject to any disclaimer, the term of this patent is extended or adjusted under 35 U.S.C. 154(b) by 35 days.

(21) Appl. No.: 09/907,477

(22) Filed: Jul. 17, 2001

(65) Prior Publication Data

US 2003/0015847 A1 Jan. 23, 2003

(51) Int. Cl.$^7$ .............................................. B60G 17/00
(52) U.S. Cl. ....................................................... 280/5.5
(58) Field of Search ............................... 280/5.5, 5.515, 280/5.519, 5.514

(56) References Cited

U.S. PATENT DOCUMENTS

| | | | | |
|---|---|---|---|---|
| 3,434,270 A | * | 3/1969 | Gaunt et al. | 56/10.2 R |
| 3,805,674 A | * | 4/1974 | Sebesta et al. | 137/625.63 |
| 4,427,121 A | * | 1/1984 | Clements | 182/2.8 |
| 4,730,543 A | * | 3/1988 | Holmes | 137/596.12 |
| 4,995,517 A | * | 2/1991 | Saotome | 212/261 |
| 5,007,544 A | * | 4/1991 | Saotome et al. | 212/261 |
| 5,048,296 A | * | 9/1991 | Sunamura et al. | 60/468 |
| 5,116,188 A | * | 5/1992 | Kurohashi et al. | 414/685 |
| 5,245,826 A | * | 9/1993 | Roth et al. | 60/413 |
| 5,335,856 A | * | 8/1994 | Nathan | 172/324 |
| 5,513,491 A | * | 5/1996 | Broenner et al. | 60/413 |
| 5,520,499 A | * | 5/1996 | Ufheil et al. | 414/685 |
| 5,522,212 A | * | 6/1996 | Kubik | 60/414 |
| 5,733,095 A | * | 3/1998 | Palmer et al. | 414/685 |
| 6,145,859 A | * | 11/2000 | Altherr et al. | 280/124.116 |
| 6,260,355 B1 | * | 7/2001 | Rausch et al. | 60/413 |
| 6,279,316 B1 | * | 8/2001 | Vigholm | 60/413 |
| 6,398,227 B1 | * | 6/2002 | Lech et al. | 280/5.5 |
| 2002/0000699 A1 | * | 6/2001 | Ruddle | 280/5.5 |

FOREIGN PATENT DOCUMENTS

JP 02289932 A * 11/1990 ............ G11B/7/24

* cited by examiner

Primary Examiner—Paul N. Dickson
Assistant Examiner—Laura B. Rosenberg
(74) Attorney, Agent, or Firm—King & Jovanovic, PLC

(57) ABSTRACT

A ride control system comprising a member for substantially equalizing pressure and ride valve having three positions, namely, a first inactive position, a second active position and an intermediate equalizing position. The substantial pressure equalizing member equalizing the pressure within the head side of at least one boom cylinder with an accumulator. The inactive position corresponding to one in which the ride valve assembly maintains isolation between the accumulator and at least one boom cylinder. The active position corresponding to one in which the ride valve assembly places the accumulator and at least one boom cylinder in communication with each other. The intermediate position corresponding to one in which the ride valve assembly maintains isolation between the accumulator and at least one boom cylinder and facilitates the activation of the substantial equalizing means.

15 Claims, 8 Drawing Sheets

US 6,634,653 B2

RIDE CONTROL SYSTEM FOR CONSTRUCTION EQUIPMENT

BACKGROUND OF THE INVENTION

1. Field of the Invention

The invention relates in general to a ride control system for construction equipment, and more particularly, to a ride system which minimizes undesirable back and forth movement of construction equipment (i.e., a loader) due to the inertia of a load.

2. Background Art

One problem that has been observed while operating construction equipment having a load carrier (i.e. a bucket) is that the weight of a loaded raised bucket causes the entire loader (or other construction equipment) to bounce back and forth as it is driven. This is due primarily to the large moment of inertia of the load and of the loader across a comparatively short wheelbase.

Certain systems have been developed to counteract this tendency to bounce back and forth. Such systems include an accumulator which is selectively connected to the bucket hydraulics (the hydraulic cylinders of the boom) to essentially utilize these hydraulic cylinders as a suspension system. By cushioning and absorbing energy from the movement of the load, the ride becomes substantially less bouncy. Such systems are generally activated by the operator in the cab when a softer ride is needed.

While these systems have proven to be advantageous, such systems nevertheless suffer certain drawbacks. For example, in certain situations, the hydraulic pressure becomes unequalized between the accumulator and the hydraulic boom cylinders. In turn, if the accumulator pressure is substantially higher than that of the boom cylinders, as the user activates a conventional system the load within the loader may momentarily rise before the pressures reach equilibrium. Conversely, if the pressure in the boom cylinders is greater than that of the accumulator, then the load within the bucket may momentarily fall before the pressures reach equilibrium.

Accordingly, it is an object of the invention to provide a time delay between the activation of a soft ride system and the operation of the system, to, in turn, equalize the pressures between the accumulator and boom cylinder.

It is another object of the invention to provide a system which prevents bucket movement upon activation of a ride control system.

It is yet another object of the invention to provide a system which equalizes pressures between the accumulator and the boom cylinder prior to operation of a ride control system.

This and other objects of the invention will become apparent in light of the specification, drawings and claims attached hereto.

SUMMARY OF THE INVENTION

One aspect of the invention comprises a ride control system which includes a substantial equalizing means and a ride valve assembly. The means for substantially equalizing the pressure substantially equalizes the pressure within the head side of at least one boom cylinder with an accumulator. The ride valve assembly includes three positions, a first inactive position, a second active position and an intermediate equalizing position. The inactive position corresponds to one in which the ride valve assembly maintains isolation between the accumulator and at least one boom cylinder. The active position corresponds to one in which the ride valve assembly places the accumulator and at least one boom cylinder in communication with each other. The intermediate position corresponds to one in which the ride valve assembly maintains isolation between the accumulator and at least one boom cylinder and facilitates the activation of the substantial equalizing means.

In one embodiment of the invention, the substantial equalizing means comprises an equalizing valve having a first position wherein the accumulator is placed in fluid communication with a pump, a second position wherein the accumulator is placed in fluid communication with a hydraulic tank, and a neutral position wherein the accumulator is isolated from each of the pump and the hydraulic tank. The equalizing valve is selectively associated with each of the accumulator and at least one boom cylinder upon positioning of the ride valve assembly in an intermediate position. In such a position, a positive pressure difference between the accumulator and the at least one boom cylinder forces the equalizing valve into a second position. To the contrary, a negative pressure difference between the accumulator and the at least one boom cylinder forces the equalizing valve into a first position. Such movement continues until substantially equal pressures in each of the accumulator and the at least one boom cylinder force the equalizing valve into the neutral position.

In another preferred embodiment, the ride valve assembly comprises a starter valve and a follower valve. A rocker is associated with each of the starter valve and the follower valve. The rocker facilitates corresponding movement between the starter valve and the follower valve.

In one such embodiment, the starter valve is associated with each of the accumulator and the head side of the at least one boom cylinder. Additionally, the follower valve is associated with each of the rod side of the at least one boom cylinder, a hydraulic tank and the substantial equalizing means.

In another such embodiment, the ride control system further includes an axial port associated with the starter valve, the axial port having an orifice to control the maximum quantity of fluid passing to the starter valve, to, in turn, control the rate of movement of the starter valve from each of the inactive position to the active position. In one embodiment, the orifice comprises a helically wound path having a predetermined cross-sectional area. In another such embodiment, the axial port further includes a check valve. The check valve facilitates unidirectional flow of fluid from within the starter valve at a greater flow rate than the orifice.

In another aspect of the invention, the invention comprises a ride control system comprising an equalizing valve and a ride control valve. The equalizing valve includes a neutral position wherein the accumulator is isolated from a pump and from a hydraulic tank, a first position wherein the accumulator is in fluid communication with a pump and a second position wherein the accumulator is in fluid communication with the hydraulic tank. The equalizing valve further includes a first port associatable with the accumulator and a second port associatable with the head side of the at least one boom cylinder. The equalizing valve is urged into a first position wherein the pressure within the accumulator is less than that of the at least one boom cylinder and a second position wherein the pressure within the accumulator is greater than that of the at least one boom cylinder, and a neutral position wherein the pressure within the accumulator and the at least one boom cylinder are in substantial equilibrium. The ride control valve includes a first position wherein the accumulator is isolated from the at least one boom cylinder and a second position wherein the accumulator is in fluid communication with the at least one boom cylinder. The ride control valve further includes means for activating the equalizing prior to placement in the second position.

In one embodiment, the rod side of the at least one boom cylinder is placed in fluid communication with a hydraulic tank. In another embodiment, the system further including at least one switch associated with the ride control valve, the at least one switch capable of causing the ride control valve from a first position to a second position.

The invention further comprises a method for controlling the ride of a user. The method comprises the steps of: activating a ride control system, comparing the pressure within the accumulator and a head side of at least one boom cylinder, associating the accumulator with a pump if the pressure in the head side of the at least one boom cylinder is greater than that of the accumulator, associating the accumulator with a hydraulic tank if the pressure in the head side of the at least one boom cylinder is less than that of the accumulator, isolating the accumulator from either of the hydraulic tank or the pump when the pressure between the head side at least one boom cylinder is substantially equalized with that of the accumulator, and, placing the accumulator and the at least one boom cylinder in fluid communication.

In a preferred embodiment, method further comprises the step of placing the rod side of at least one boom cylinder in fluid communication with a hydraulic tank.

The invention further comprises another method of controlling the ride of a user comprising the steps of providing a switch for activating a ride control, providing a time delay between the activation of the switch of the user and the activation of a ride control system, and, equalizing the pressure between the accumulator and a head side of at least one boom cylinder during the time delay.

In one embodiment, the time delay is less than 3 seconds.

BEST MODE FOR PRACTICING THE INVENTION

Figure 1:
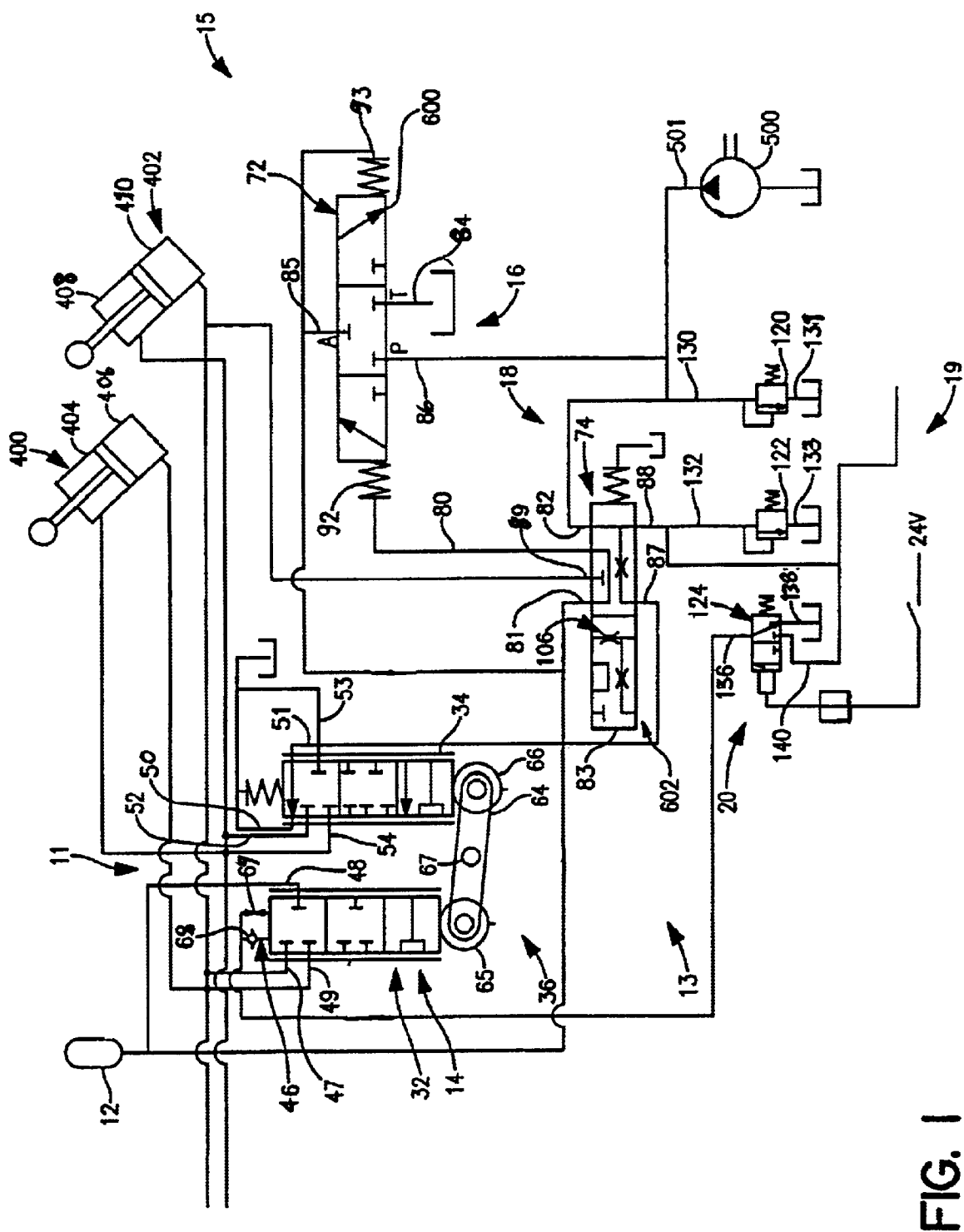
FIG. 1 of the drawings is a schematic view of the system showing schematically the interaction of the passages and valves prior to the system being activated.

While this invention is susceptible of embodiment in many different forms, there is shown in the drawings and will be described in detail, specific embodiments with the understanding that the present disclosure is to be considered as an exemplification of the principles of the invention and is not intended to limit the invention to the embodiments illustrated.

Referring now to the Figures, and in particular to FIGS. 1–6, ride control system is shown at 10. Ride control system 10 is generally suited for associating the boom cylinders 400, 402 which correspond to the boom of a loader, backhoe, etc. with accumulator 12, so as to cushion the load within the bucket thereof. While the ride control system is generally adapted for use in association with, for example, construction equipment, such as a construction loader, it may be used with other equipment.

Ride control system 10 comprises means 11 for associating the boom cylinders 400, 402 with the accumulator, means 13 for delaying the associating of the boom cylinders with the accumulator upon activation of the system and means 15 for substantially equalizing the pressure between the boom cylinders and the accumulator.

Associating means 11 comprises ride valve assembly 14 and its cooperation with switch 20 and association with each of accumulator 12 and boom cylinders 400, 402. Time delay means 13 comprises the interaction of ride valve assembly 14 and signal valve 18. Substantial equalizing means 15 comprises equalizer valve 16 in cooperation with ride valve assembly 14 and signal valve 18.

More specifically, ride control system 10 is associated with pilot pump 500 (which generally comprises a hydraulic pump which is capable of approximately 8 to 10 GPM) to pump output 501. As will be explained in detail below, when ride control system is activated, the head sides of the boom cylinders 406, 410 are connected to the accumulator and the rod sides 404, 408 are connected to the hydraulic tank. In turn, when the vehicle hits a bump there is communication and transfer of hydraulic fluid to and from the accumulator and the head sides of the boom cylinders to, essentially, cushion the jolt and soften the ride. In addition, the system provides a delay between the activation and operation of the system to equalize the pressures within each of the cylinders and the accumulator. It will be understood that the invention is not limited to this embodiment, and, other embodiments are likewise contemplated which correspond to the schematic, or which correspond to the function thereof.

Again referring to FIGS. 1–6, accumulator 12 comprises a holding tank capable of receiving fluid and having fluid work against compressible gas. Generally accumulator 12 comprises a container which is roughly 4–8 quarts capacity, while, larger and smaller accumulators are likewise contemplated.

Ride valve assembly 14 is shown in FIG. 1 as comprising starter valve 32, follower valve 34, rocker 36. Starter valve 32 can be placed in three distinct orientations (a first inactive position, a second active position and an intermediate equalizing position) and is associated with axial passage 46, first passage 47, second passage 48 and third passage 49. Follower valve 34 can be placed in three distinct orientations (a first inactive position, a second active position and an intermediate equalizing position) and is associated with axial passage 50, first passage 51, second passage 52, third passage 53 and fourth passage 54. As will be explained, the starter valve and the follower valve place these passages in various configurations to provide one of fluid communication and isolation therebetween.

Rocker 36 is shown in FIG. 1 as comprising arm 64, first roller 65 and second roller 66. Arm 64 is mounted about axis 67, such that, in turn, the arm pivots about axis 67. First roller 65 is associated with starter valve 32, such that movement of valve 32 against first roller 65 rotates arm 64 about axis 67. Similarly, second roller 66 is associated with follower valve 34, such that movement of spool 34 against second roller 66 rotates arm 64 about axis 67. The rollers are utilized to minimize friction between rocker 36 and the first and second spools 32, 34. Of course, other means for coupling the spools and the rocker are likewise contemplated, which likewise permit such relative movement.

Advantageously, the use of two spools that are associated with each other permits a compact installation which permits relatively short spools that nevertheless provide for relatively large flow area between the boom cylinder and the accumulator. This is necessary to achieve fast energy transfer and a smooth ride for the vehicle. Generally, in conventional assemblies, such operation is accomplished by way of a single large spool having a relatively large length dimension. Due to tolerances, such a spool is generally very difficult to manufacture and such a spool necessitates a very large casing and a large assembly. On the contrary, the relatively short combination of multiple associated spools are substantially easier to produce and provide for a smaller assembly.

Figure 8:
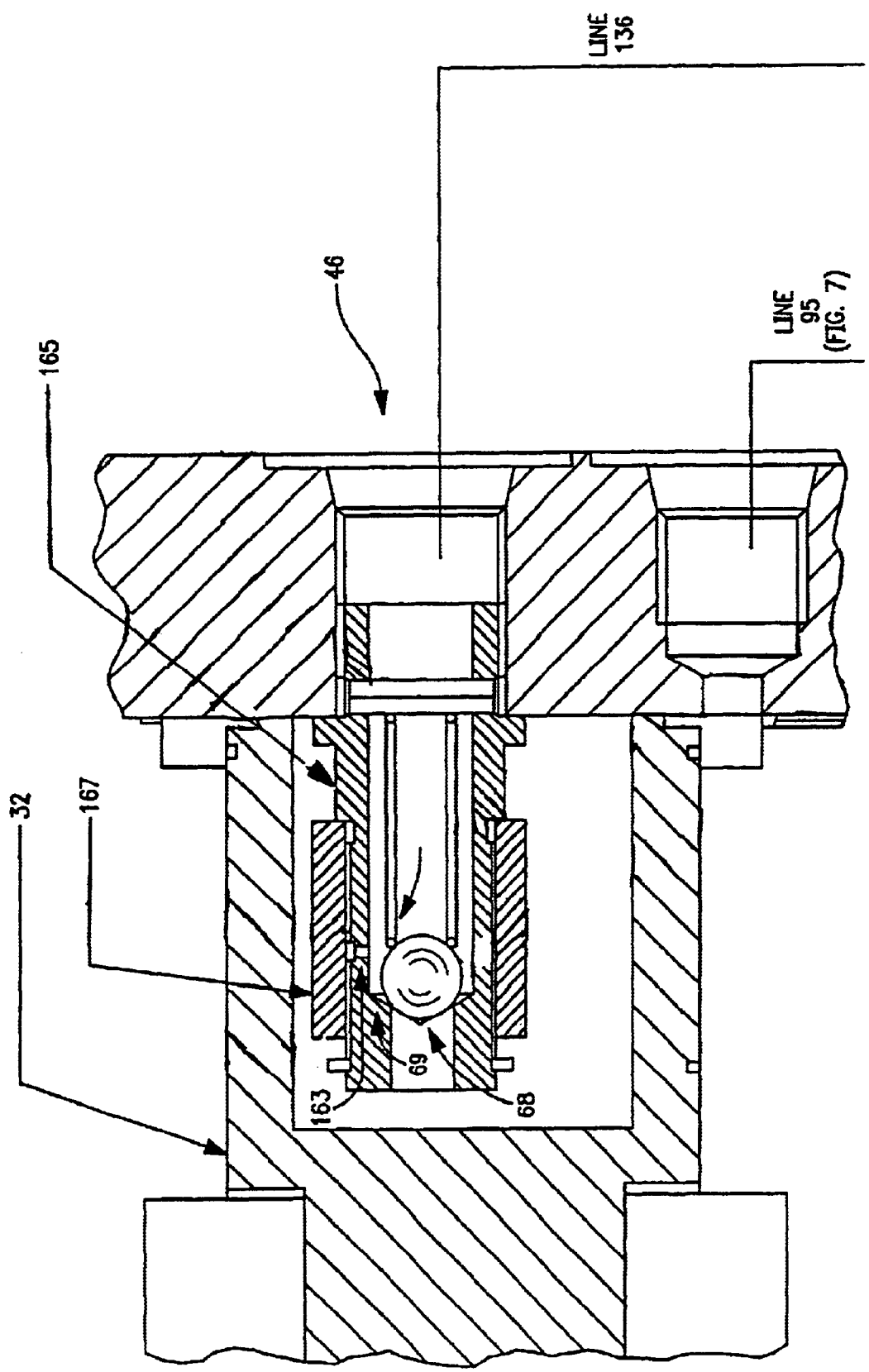
FIG. 8 of the drawings is a schematic view of the axial input to the starter spool.

Axial passage 46 is shown in FIG. 1 as comprising check valve 68 and flow constrictor (orifice) 69. In particular, check valve 68 permits flow only out of the casing, and flow constrictor 69 limits the flow into and out of the valve casing. While various embodiments are contemplated, flow constrictor 69 may comprise a passage of relatively small cross-section that extends spirally around a certain circumference so that a substantially long passage having a small cross-section is created. One such embodiment is shown in FIG. 8 wherein a small helical passage is created between sleeve 167 and stud 165. As such fluid passes through opening 163 it extends circumferentially around stud 165 as it proceeds starter spool 32. By creating a longer passage, the time required to advance first valve 32 into the various positions can be controlled. By positioning check valve 68 and flow constrictor 69 in parallel, rapid flow is permitted out of the casing, whereas flow through the constrictor is permitted into the casing. In turn, and as will be explained below, while the passage of fluid into the bore at a relatively slow rate, passage of fluid from within the bore can be accomplished quickly.

In another embodiment, the axial passage may be replaced with a stepper motor and a lead screw which can precisely control the movement of the starter spool (and the associated follower spool). Such a stepper motor can be controlled by a separate logic circuit or microprocessor circuit. Of course, other methods of providing movement of the starter spool are likewise contemplated for use.

Equalizer valve 16 is shown in FIGS. 1–6 as comprising spool 72 which is selectively placeable in three orientations (a first position, a second position and a neutral position) and is associated with axial passages 92 and 93, accumulator input 85, pump input 86 and tank input 84. Based on the relative pressures between fluid within axial passages 92, 93, the various inputs 84, 85 and 86 are selectively placed in fluid communication.

Signal valve 18 is shown in FIGS. 1–6 as comprising spool 74 which is selectively placeable in two orientations and is associated with first port 80, second port 82, third port 89, first output 88, and second output 87 and axial input 83. As will be explained, fluid within axial input 83 controls the spool position between a first and a second position.

Pressure regulator 19 is shown in FIG. 1 as comprising high pressure valve 120, low pressure valve 122 and ride selector valve 124. High pressure valve 120 includes inlet 130 and outlet 131. Inlet 130 is selectively isolatable from outlet 131 upon sensing of a pressure in excess of a predetermined pressure. Low pressure valve 122 includes inlet 132 and outlet 133. Inlet 132 is selectively isolatable from outlet 133 upon sensing of a pressure in excess of a predetermined pressure. Ride selector valve 124 includes inlet 136, outlet 138 and outlet 140. Inlet 136 of ride selector valve 124 can selectively be placed into communication with either of outlet 138 and outlet 140.

The relationship between components will be explained with reference to FIG. 1. Specifically, system 10 is associated with boom cylinders 400, 402. In particular, rod side 404 of boom cylinder 400 is placed in fluid communication with fourth passage 54. Similarly, rod side 408 of boom cylinder 402 is placed in fluid communication with second passage 52. Head side 406 of boom cylinder 400 is in fluid communication with third passage 49, and head side 410 of boom cylinder 402 is in fluid communication with first passage 47 and third port 89. Accumulator 12 is in fluid communication with second passage 48 and accumulator input 85. In addition, the head sides and the rod sides of each of the boom cylinders is in fluid communication. While the system is shown with respect to two boom cylinders, it is understood that the principles are equally applicable to a system having a greater or fewer number of boom cylinders.

Third passage 53 of follower valve 34 is associated with the hydraulic fluid tank (it will be understood, that the hydraulic tank may comprise a plurality of separate tanks which may be in selective communication with each other, a single tank or a area of low pressure fluid—which fluid may or may not be recirculated by the pump back into the system). Similarly axial passage 50 is associated with the hydraulic fluid tank. Axial passage 46 is associated with port 136 of ride selector valve 124. First passage 51 is associated with second outlet 87 signal valve 18. Second outlet 87 generally includes orifice 187 which minimizes the flow to and through second outlet 87. In particular, as the second outlet 87 is ultimately associated with the hydraulic tank when the ride control is not activated, without orifice 187, the flow through second outlet to the tank would generally be deemed excessive. Tank input 84 is associated with the hydraulic fluid tank. First output 88 is associated with inlet 132 of low pressure valve 122 and with outlet 140 of ride selector valve 124. Each of outlets 131, 133 and 138 of the respective high, low and ride control valves are each associated with the hydraulic tank. Output 501 of pump 500 is in fluid communication with each of inlet 130 of high pressure pump 120 and pump input 86. The operation of the system will be described with reference to FIGS. 1–6. In particular, FIG. 1 shows the system prior to the engagement of the ride selector switch. In such a position, pump 500 supplies the system with fluid. In such a position, both high pressure valve 120 and low pressure valve 122 are in direct fluid communication with pump 501. With respect to low pressure valve 122, the flow from pump is achieved through the communication between first port 82 and first outlet 88. As each of the high and low pressure valves are exposed to full flow from the pump, the low pressure valve 122 maintains the pressure in the system at the low pressure valve pressure.

All three inputs of equalizer valve 16 are isolated from each other. Similarly, all three passages 47, 48 and 49 are isolated from each other by starter valve 32. Further, axial passage 46 is associated with inlet 136, outlet 138, and, in turn, the hydraulic tank. With respect to follower 11 valve 34, ports 52, 53 and 54 are isolated from each other. Port 51 is coupled to port 50 which are both associated with the hydraulic tank.

With respect to signal valve 74, input 80 is coupled to port 81 and port 89 is isolated. As ports 80 and 81 are coupled, the pressure at axial port 92 and 93 of equalizer valve 72 are maintained in equilibrium, and, in turn, maintain the valve 72 in the central orientation. First port 82 is in association with first and second outputs 87 and 88. As previously explained, first port 82 and second output 88 place the pump in fluid communication with low pressure valve 122. A portion of this flow (i.e. 1–5% and preferably 2%, depending on the properties of orifice 187) is directed through second outlet 87 and in turn to passage 83. In turn, this flow proceeds through passages 51 and 50, and, ultimately to the hydraulic tank.

Figure 2:
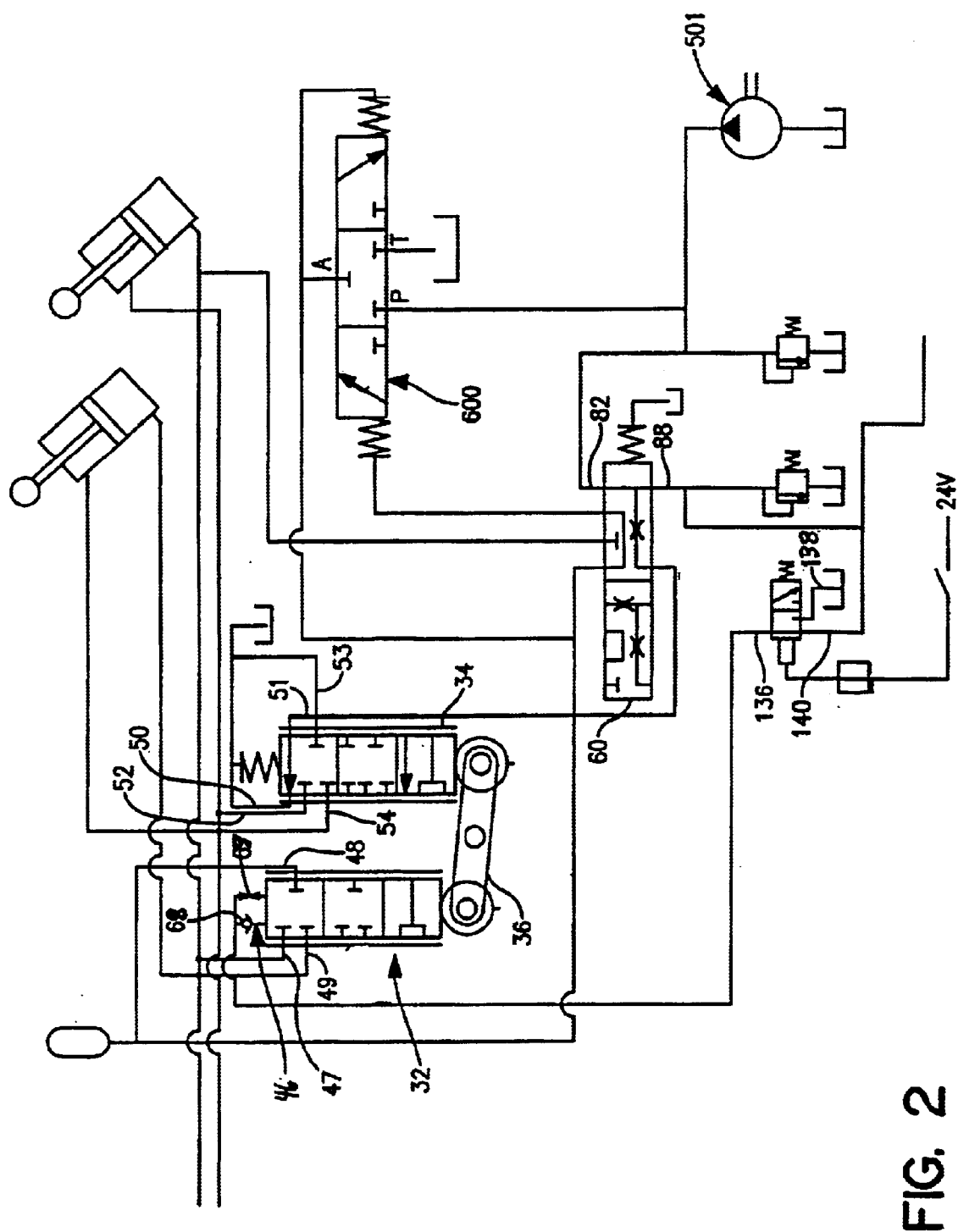
FIG. 2 of the drawings is a schematic view of the system showing schematically the interaction of the passages and valves as the system is activated.

As the ride selector switch is activated, or ride selector valve is otherwise actuated, as shown in FIG. 2, outlet 140 is placed in fluid communication with inlet 136 and outlet 138 is isolated. Once the switch is closed, pressure at the low pressure setting (i.e. 350 psi) is directed from pump 501 through first input 82, first outlet 88 and in turn to inlet 140 of ride selector valve 124. The fluid is directed through inlet 136 and through flow constrictor (orifice) 69 of axial passage 46. This movement causes first spool to move downward. The flow constrictor limits the fluid that passes therethrough to limit the speed at which the starter valve moves. By varying the length of the helical/cylindrically positioned passage or the cross-sectional area, the rate of movement of the starter valve among the different orientations can be controlled.

Figure 3:
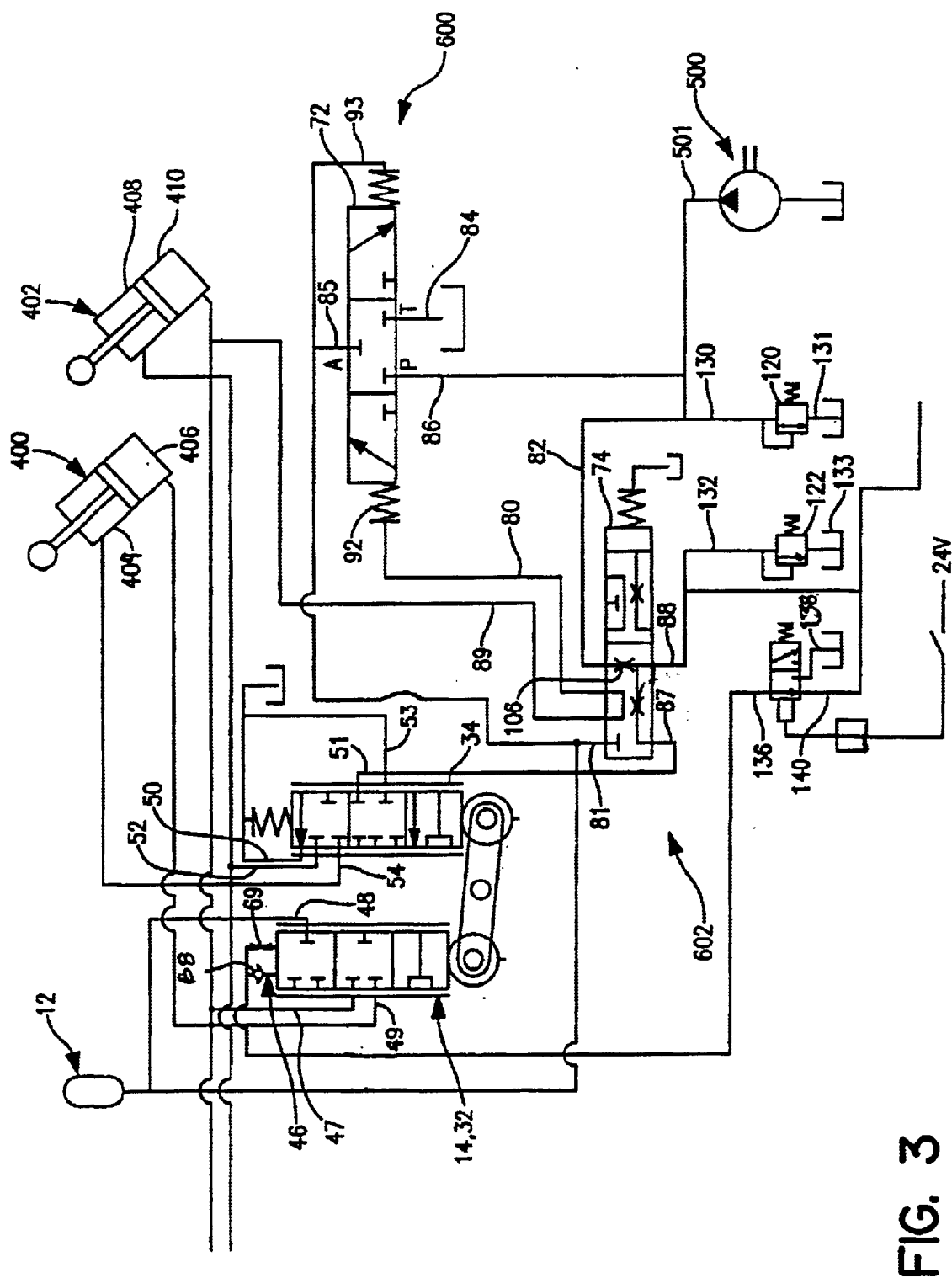
FIG. 3 of the drawings is a schematic view of the system showing schematically the interaction of the passages and valves as the system begins operation.
Figure 4:
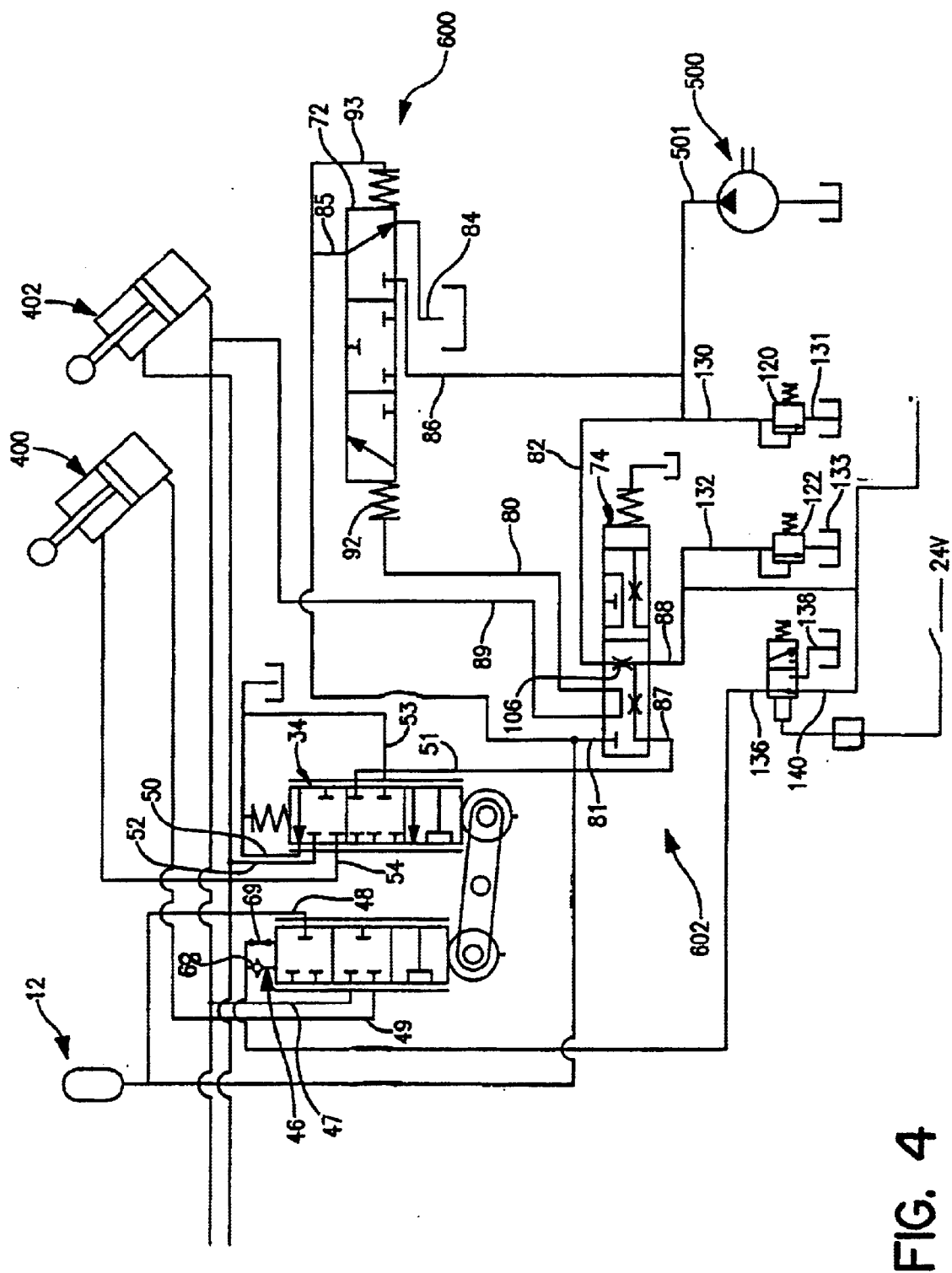
FIG. 4 of the drawings is a schematic view of the system showing schematically the interaction of the passages and valves in a situation wherein the accumulator has a pressure greater than that of the head port.

Inasmuch as the starter valve is associated with the follower valve by way of the rocker 36, movement of the starter valve in a downward direction causes movement of the follower valve in an upward direction. As shown in FIG. 3, as the valves (spools) move due to the pressure of fluid through axial passage 46, ports 47, 48 and 49 of the starter valve remain isolated, and ports 52, 53 and 54 of the follower valve remain isolated. In addition, ports 50 and 51 are no longer in fluid communication; rather, they are likewise isolated.

Since port 51 is isolated, pressure within axial port 83, which is fed by port 82 (FIG. 2) increases, which moves the follower spool. The movement of signal spool 74, port 81 becomes isolated, ports 89 and 80 are placed in fluid communication, and port 82, 87 and 88 remain in fluid communication, with the exception that orifice 106 extends between port 82 and port 88 to limit flow.

Figure 5:
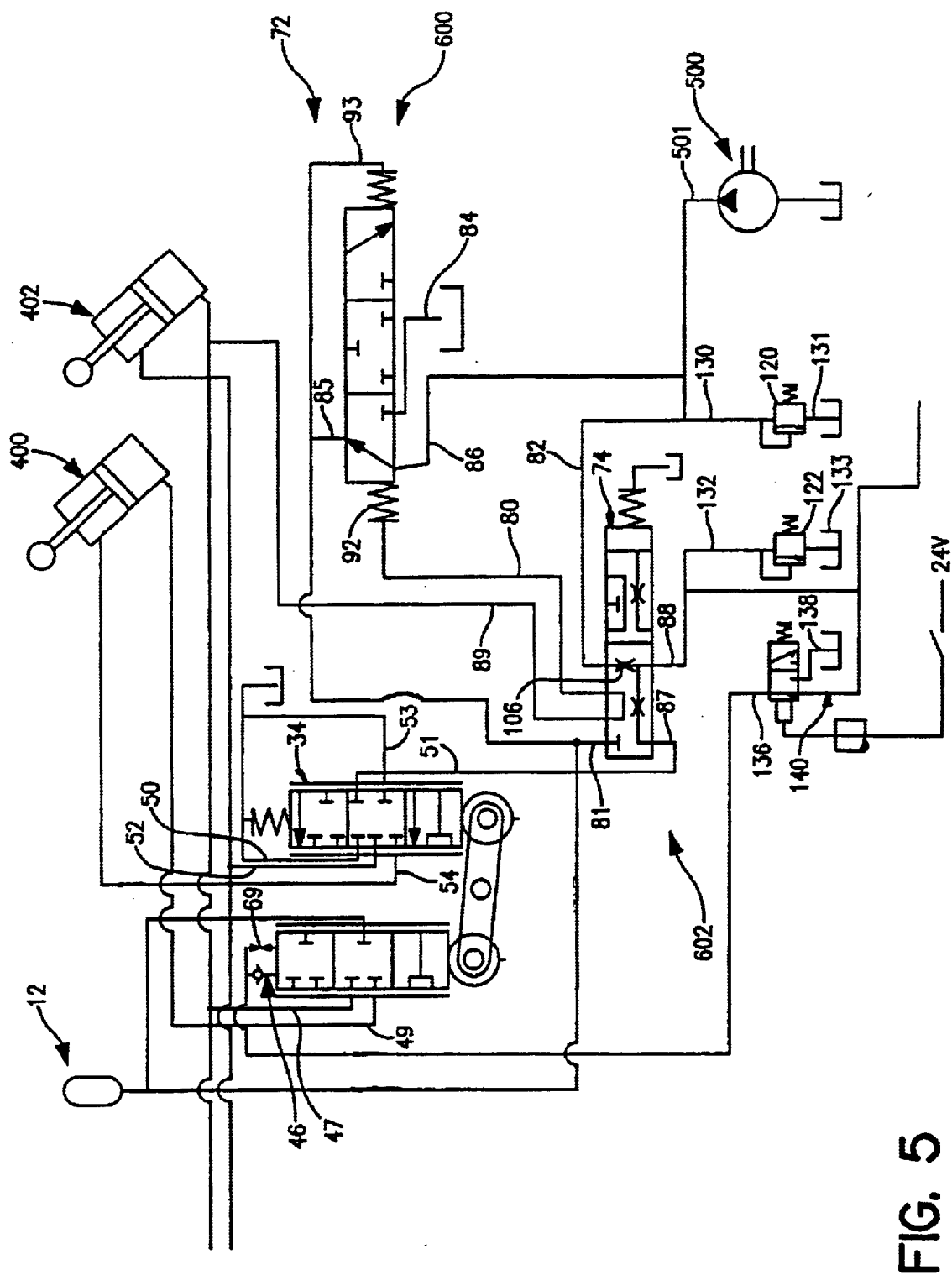
FIG. 5 of the drawings is a schematic view of the system showing schematically the interaction of the passages and valves in a situation wherein the head port has a pressure greater than that of the accumulator.
Figure 6:
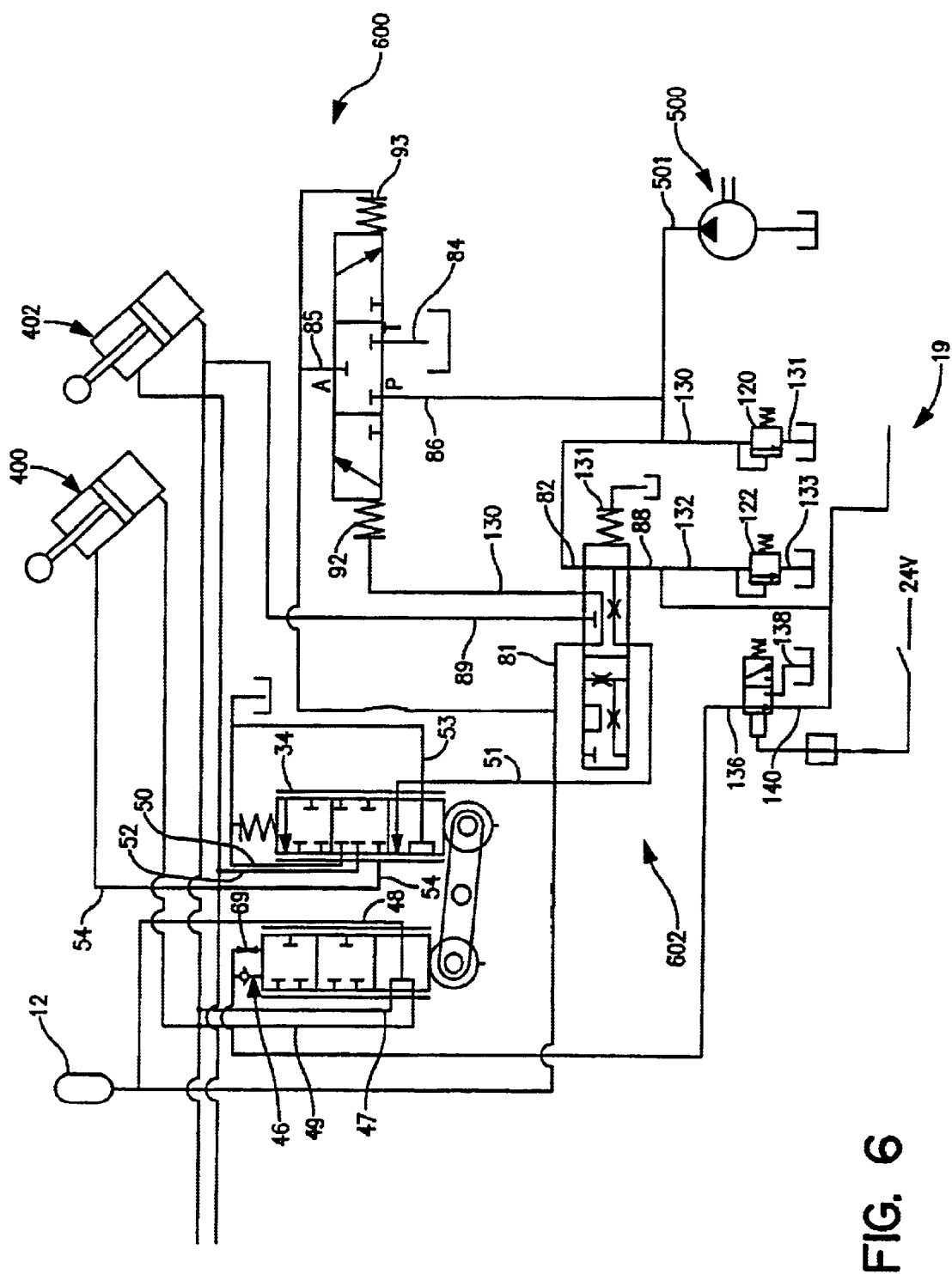
FIG. 6 of the drawings is a schematic view of the system showing schematically the interaction of the passages and valves in a situation wherein equilibrium is substantially reached between the head port and the accumulator and ride control is activated.

As a result of the movement of the signal valve 74 of logic valve 16, the accumulator is placed in fluid communication with port 93 and head port of boom cylinders 400, 402 are placed in fluid communication with axial port 92. As will be understood, if the pressure within axial port 93 do not match the pressure within axial port 92, the fluid pressure difference between ports 92 and 93 will operate to move equalizer valve 72. Specifically, as shown in FIG. 5, if the pressure in axial port 93 exceeds that which is in axial port 92, then equalizer valve 74 is directed in a first direction. Such movement places ports 85 and 84 in fluid communication and isolates port 86. In such a case, hydraulic fluid is drained from the accumulator to the hydraulic tank until the pressures in axial ports 92 and 93 are substantially equalized (it will be understood that substantially equalized has a tolerance such that the two do not have to be exactly the same—specifically, there is a range above and below exact equilibrium wherein the difference is such that the load largely remains unaffected by this difference when the head side of the boom cylinders is associated with the accumulator). Once such a substantial equilibrium is achieved, equalizer valve 74 returns in the second direction to a neutral position (and is centered by springs) such that each of ports 84, 85 and 86 are isolated.

If, on the other hand, pressure in axial port 92 exceeds that which is in axial port 93, then equalizer valve 74 is directed in the opposite direction. Such movement places ports 86 and 85 in communication and places port 84 in isolation. In turn, pressure from port 86 proceeds through port 85 and is directed to the accumulator. As orifice 106 only permits a portion of the fluid to port 88, low pressure valve 122 is not controlling (essentially) and the pressure supplied to inlet port 86 is substantially equal to the setting of high pressure valve 120 and/or the capacity of pump 500. As equilibrium is approached the pressures upon each of ports 92 and 93 substantially equalize and the spool returns to a position wherein the ports 84, 85 and 86 are isolated from each other.

The foregoing equalization occurs while the starter and follower valves of ride valve assembly 14 are in the position shown in FIG. 3. Subsequently, as the valves (spools) continue to move, eventually, the starter and follower valves are in the condition shown in FIG. 6. Specifically, port 48 is associated with each of ports 47 and 49. In turn, this communication associates head ports 406, 410 with the accumulator. Thus offering a load that is cushioned by fluid passing into and out of accumulator 12.

Simultaneously, the follower valve is in such a position that ports 52 and 54 are in fluid communication with port 53, and, in turn, the hydraulic tank. As such, head ports 404, 408 are drained to the hydraulic tank. Also, port 51 is in communication with port 50, and, in turn, the hydraulic tank. As such, pressure within port 87 is reduced and the spring 131 forces spool 74 to its original position wherein port 80 and 81 are in communication, port is isolated, and ports 88 and 87 are in communication with port 82. At this time, the ride control mode is fully executed.

Figure 7:
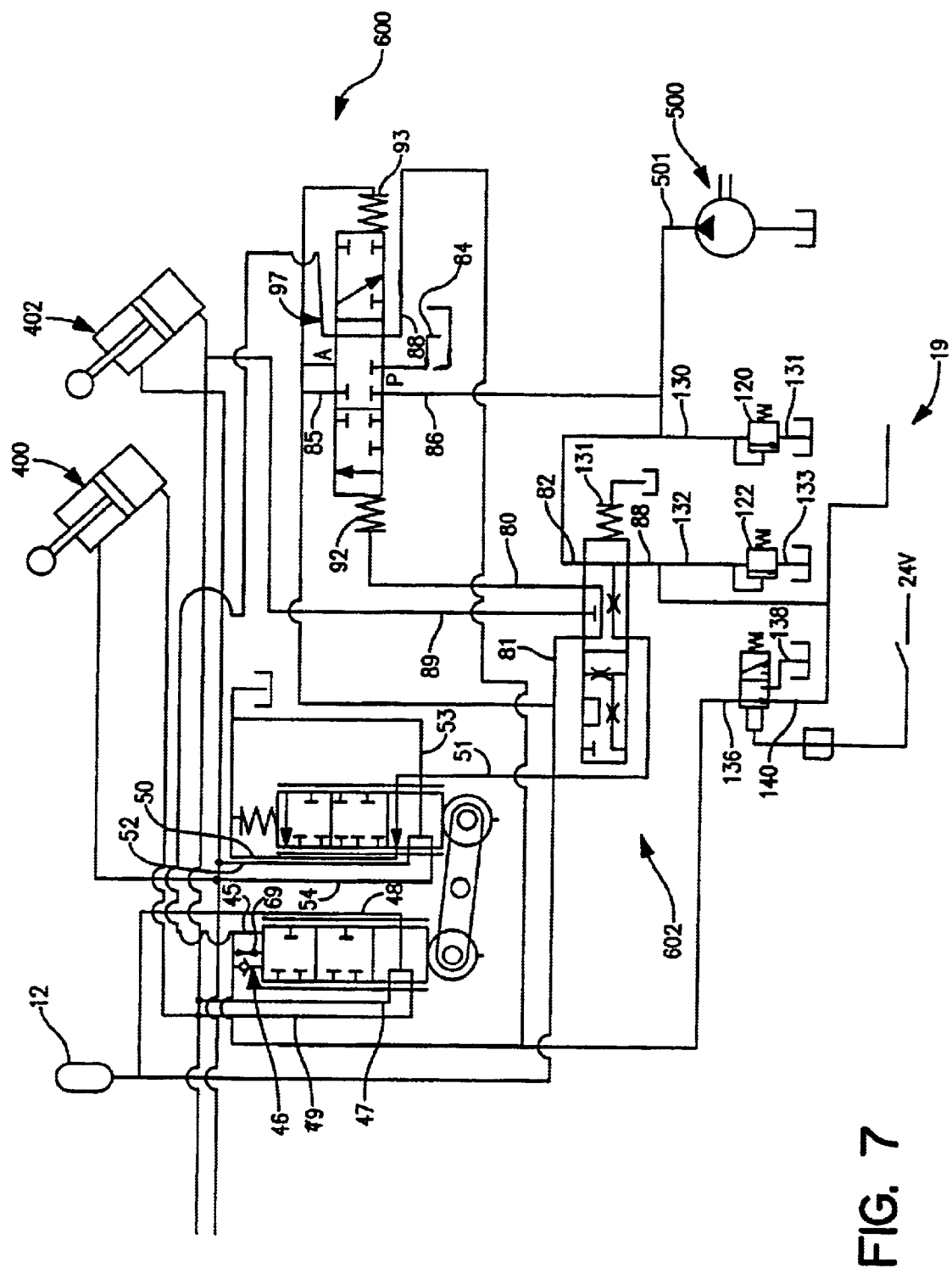
FIG. 7 of the drawings is a schematic view of the system including additional ports on the equalizer valve so as to permit the activation of the ride control after equalization of the boom cylinder pressure and the accumulator.

In one embodiment of the invention, as shown in FIG. 7, the equalizer valve may include an additional input 99 and an additional output 97. In such an embodiment, the input 99 and the output 97 are in fluid communication with each other. Input 99 is in communication with axial input 46 and output 97 is in communication with additional port 95 of axial input 46. In operation of such an embodiment, as the pressures in each of the accumulator and boom cylinders substantially equalizes, and the equalizer valve returns to a neutral position, input 99 and output 97 are in fluid communication. As such, a greater flow is directed to the valve from the axial input 46 and, fluid is delivered through constrictor 69 and additional port 95 (which is generally less restrictive than flow constrictor 69). In turn, starter valve 32 (and follower valve 34) move to the active position more rapidly. In this manner, the ride control is activated (i.e., the valves of the ride valve assembly reach the active position) almost immediately (or sooner than would otherwise be accomplished by flow through constrictor 69 alone) after substantial equilibrium in the equalizer valve is achieved.

Once the user decides to return to a normal mode of operation, the user disengages ride control valve 124 such that inlet 136 is in communication with port 138, and, in turn, the hydraulic tank. In such a mode, fluid that was directed into axial passage 46 returns through check valve 68 into the hydraulic tank. Additionally as shown in FIG. 1, via a spring force, the ports of the starter and follower return to their original configuration, namely, wherein ports 46, 47 and 48 are isolated, and wherein ports 52, 53 and 54 are isolated. Further port 51 is in communication with port 50 and, in turn, the hydraulic tank.

Advantageously, the foregoing system provides a time delay between the activation and the initiation of ride control, to, in turn, charge or discharge the accumulator such that the accumulator and the head sides of the boom cylinders. As a result, once the ride control is activated, the load does not undesirably fluctuate upward or downward, and instead remains substantially steady.

The foregoing description and drawings merely explain and illustrate the invention and the invention is not limited thereto except insofar as the appended claims are so limited, as those skilled in the art who have the present disclosure before them will be able to make modifications and variations therein without departing from the scope of the invention.

What is claimed is:

1. A ride control system comprising:
    means for substantially equalizing the pressure within the head side of at least one boom cylinder with an accumulator, and
    a ride valve assembly having three positions, a first inactive position, a second active position and an intermediate equalizing position;
    the inactive position corresponding to one in which the ride valve assembly maintains isolation between the accumulator and at least one boom cylinder,
    the active position corresponding to one in which the ride valve assembly places the accumulator and at least one boom cylinder in communication with each other, and
    the intermediate position corresponding to one in which the ride valve assembly maintains isolation between the accumulator and at least one boom cylinder and facilitates the activation of the substantial equalizing means,
    wherein the means is fluidly isolated from the boom cylinder and the accumulator upon positioning of the rider valve assembly into the active position, and such fluid isolation is maintained as long as the ride valve assembly is maintained in the active position.

2. The ride control system of claim 1 wherein the substantial equalizing means comprises:
    an equalizing valve having a first position wherein the accumulator is placed in fluid communication with a pump and a second position wherein the accumulator is placed in fluid communication with a hydraulic tank, and a neutral position wherein the accumulator is isolated from each of the pump and the hydraulic tank,
    the equalizing valve being selectively associated with each of the accumulator and at least one boom cylinder whereby, upon positioning of the ride valve assembly in an intermediate position, whereby a positive pressure difference between the accumulator and the at least one boom cylinder forces the equalizing valve into a second position, and wherein a negative pressure difference between the accumulator and the at least one boom cylinder forces the equalizing valve into a first position, until substantially equal pressures in each of the accumulator and the at least one boom cylinder force the equalizing valve into the neutral position.

3. The ride control system of claim 1 wherein the ride valve assembly comprises:
    a starter valve; and
    a follower valve,
    a rocker associated with each of the starter valve and the follower valve, the rocker facilitating corresponding movement between the starter valve and the follower valve.

4. The ride control system of claim 3 wherein:
    the starter valve is associated with each of the accumulator and the head side of the at least one boom cylinder;
    the follower valve is associated with each of the rod side of the at least one boom cylinder, a hydraulic tank and the substantial equalizing means.

5. The ride control system of claim 3 wherein the ride control system further includes:
    an axial port associated with the starter valve, the axial port having an orifice to control the maximum quantity of fluid passing to the starter valve, to, in turn, control the rate of movement of the starter valve from each of the inactive position to the active position.

6. The ride control system of claim 5 wherein the orifice comprises a helically wound path having a predetermined cross-sectional area.

7. The ride control system of claim 5 wherein the axial port further includes a check valve, the check valve facilitating unidirectional flow of fluid from within the starter valve at a greater flow rate than the orifice.

8. A ride control system comprising:
    an equalizing valve, the equalizing valve having a neutral position wherein an accumulator is isolated from a pump and from a hydraulic tank, a first position wherein the accumulator is in fluid communication with a pump and a second position wherein the accumulator is in fluid communication with the hydraulic tank,
    the equalizing valve further including a first port associatable with the accumulator and a second port associatable with a head side of at least one boom cylinder,
    wherein the equalizing valve is urged into a first position wherein the pressure within the accumulator is less than that of the at least one boom cylinder and a second position wherein the pressure within the accumulator is greater than that of the at least one boom cylinder, and a neutral position wherein the pressure within the accumulator and the at least one boom cylinder are in substantial equilibrium,
    a ride control valve, the ride control valve having a first position wherein the accumulator is isolated from the at least one boom cylinder and a second position wherein the accumulator is in fluid communication with the at least one boom cylinder,
    the ride control valve further including means for activating the equalizing valve prior to placement in the second position, and wherein the equalizing valve is maintained in the neutral position upon placement of the ride control valve in the second position.

9. The ride control system of claim 8 wherein a rod side of the at least one boom cylinder is placed in fluid communication with a hydraulic tank.

10. The ride control system of claim 8 further including at least one switch associated with the ride control valve, the at least one switch capable of causing the ride control valve from a first position to a second position.

11. A method for controlling the ride of a user comprising the steps of:
   activating a ride control system;
   comparing the pressure within the accumulator and a head side of at least one boom cylinder;
   associating the accumulator with a pump if the pressure in the head side of the at least one boom cylinder is greater than that of the accumulator;
   associating the accumulator with a hydraulic tank if the pressure in the head side of the at least one boom cylinder is less than that of the accumulator;
   isolating the accumulator from either of the hydraulic tank or the pump when the pressure between the head side at least one boom cylinder is substantially equalized with that of the accumulator;
   placing the accumulator and the at least one boom cylinder in fluid communication.
   maintaining the isolation of the accumulator from either the hydraulic tank or the pump so long as the accumulator and the at least one boom cylinder are maintained in fluid communication.

12. The method according to claim 11 further comprising the step of:
   placing the rod side of at least one boom cylinder in fluid communication with a hydraulic tank.

13. A method of controlling the ride of a user comprising the steps of:
   providing a switch for activating a ride control;
   providing a time delay between the activation of the switch of the user and the activation of a ride control system; and
   equalizing the pressure between the accumulator and a head side of at least one boom cylinder during the time delay.
   associating the at least one boom cylinder with the accumulator; and
   isolating the equalizing valve from each of the accumulator and the at least one boom cylinder as long as the at least one boom cylinder is associated with the accumulator.

14. The method according to claim 13 wherein the time delay is less than 3 seconds.

15. A ride control system comprising:
   means for substantially equalizing the pressure within a head side of at least one boom cylinder with an accumulator, and
   a ride valve assembly comprising having, a starter valve, a follower valve, and a rocker associated with each of the starter valve and the follower valve, the rocker facilitating corresponding movement between the starter valve and the follower valve, the ride valve assembly having three positions, a first inactive position, a second active position and an intermediate equalizing position;
   the inactive position corresponding to one in which the ride valve assembly maintains isolation between the accumulator and at least one boom cylinder,
   the active position corresponding to one in which the ride valve assembly places the accumulator and at least one boom cylinder in communication with each other,
   the intermediate position corresponding to one in which the ride valve assembly maintains isolation between the accumulator and at least one boom cylinder and facilitates the activation of the substantial equalizing means; and
   an axial port associated with the starter valve, the axial port having an orifice to control the maximum quantity of fluid passing to the starter valve, to, in turn, control a rate of movement of the starter valve from each of the inactive position to the active position, wherein the orifice comprises a helically wound path having a predetermined cross-sectional area.

* * * * *

UNITED STATES PATENT AND TRADEMARK OFFICE
CERTIFICATE OF CORRECTION

PATENT NO.     : 6,634,653 B2                                    Page 1 of 1
DATED          : October 21, 2003
INVENTOR(S)    : Chatterjea It is certified that error appears in the above-identified patent and that said Letters Patent is hereby corrected as shown below:

Column 6,
Line 43, delete "or a area" and substitute -- or an area --.

Column 7,
Line 11, delete "follower 11 valve" and substitute -- follower valve --.

Column 9,
Line 31, delete "within the" and substitute -- within a --.
Line 47, delete "wherein the means" and substitute -- wherein the equalizing means --.
Line 49, delete "rider valve" and substitute -- ride valve --.

Column 10,
Line 8, delete "valve; and" and substitute -- valve; --.
Line 9, delete "valve," and substitute -- valve; and --.

Column 11,
Line 22, delete "communication." and substitute -- communication; --.
Line 29, delete "placing the rod" and substitute -- placing a rod --.
Line 37, delete "system; and" and substitute -- system; --.

Column 12,
Line 38, delete "the accumulator" and substitute -- an accumulator --.
Line 40, after "delay", insert -- by way of an equalizing valve; --.

Signed and Sealed this

Eleventh Day of May, 2004

JON W. DUDAS
*Acting Director of the United States Patent and Trademark Office*